A. T. CLARK.
Farmer's Tool and Handle.
No. 207,643.            Patented Sept. 3, 1878.
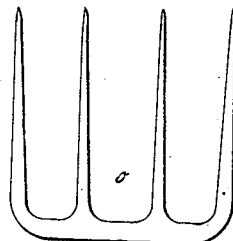
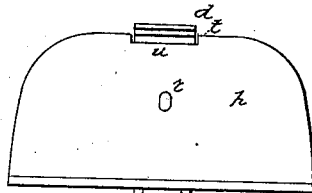
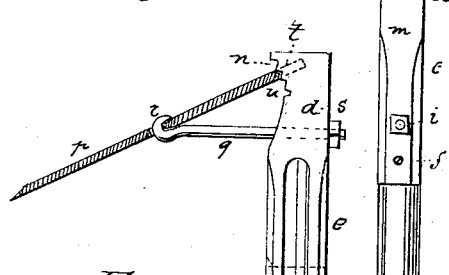
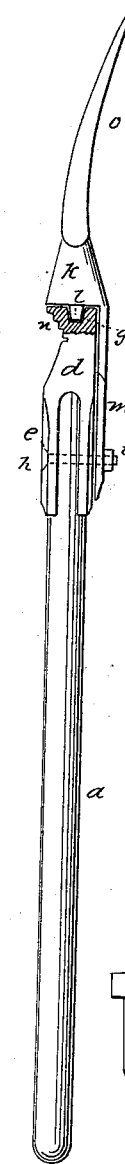
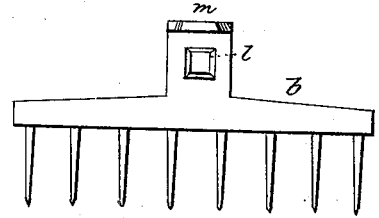
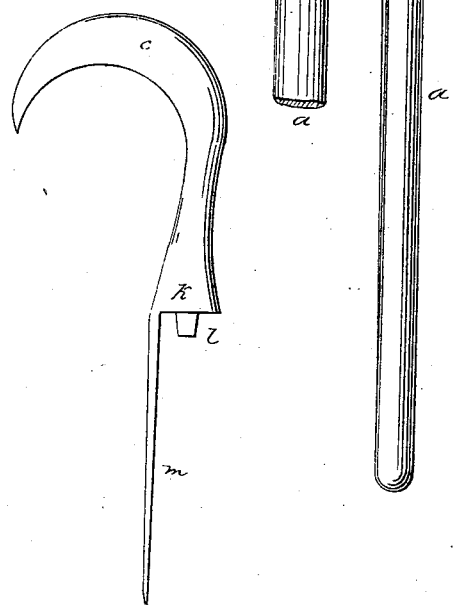
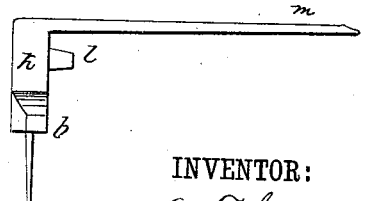
WITNESSES:            INVENTOR:
BY
ATTORNEYS.
N. PETERS, PHOTO-LITHOGRAPHER, WASHINGTON, D. C.

UNITED STATES PATENT OFFICE.

ARCHIBALD T. CLARK, OF MANCHESTER, NORTH CAROLINA.

IMPROVEMENT IN FARMERS' TOOLS AND HANDLES.

Specification forming part of Letters Patent No. 207,643, dated September 3, 1878; application filed July 6, 1878.

*To all whom it may concern:*

Be it known that I, ARCHIBALD THOMAS CLARK, of Manchester, in the county of Cumberland and State of North Carolina, have invented a new and useful Improvement in Farmers' Tools and Handles for the same, of which the following is a specification:

The object of my invention is to furnish to farmers or others that use tools for working in the soil sets of tools, such as hoes, rakes, brier-hooks, pitchforks, &c., with a handle adapted for application to any one tool of the set, and which may be readily removed from one tool and applied to another, thereby saving the expense of a separate handle for each tool.

My invention consists in a hub of peculiar form attached to a wooden handle, said hub being adapted to receive a strap and tang or stud formed upon the tool, and a screw-bolt for securing the tool. The said hub is also constructed to hold the blade of a hoe at different angles as desired.

In the drawing, Figure 1 shows an elevation of a pitchfork attached to the handle, and Fig. 2 is a side elevation of the same. Fig. 3 is a side elevation of a hoe attached to the handle, the blade being in section; and Fig. 4 is a front view of the same. Fig. 5 is an elevation of a brier-hook. Fig. 6 is a front view of a rake, and Fig. 7 is a side view of the same.

Similar letters of reference indicate corresponding parts.

$a$ is the wooden handle, of any usual or desired construction, such as is adapted for garden implements. The pitchfork $o$, rake $b$, and brier-hook or scythe $c$ are of usual construction, except in the parts used for attaching them to the handle $a$, which parts are alike on all of the above-named tools, and will be similarly described.

$d$ is a metal hub, preferably square in form, and provided with straps $e$, which form a socket for the end of the handle $a$, and into which socket the handle is inserted. A screw, $f$, through one of the straps $e$, serves to hold the hub $d$ to the handle $a$ permanently. The hub $d$ has a square end, and is provided with a tapering mortise or socket, $g$, (see Fig. 2,) and there is also a hole through the straps $e$ and handle $a$ for a screw-bolt, $h$, and nut $i$.

The above-named tools, or any others which it is desired to use with the handle, are each formed with or attached to a square base, $k$, to rest upon the squared end of the hub $d$, and upon the base $k$ there is a tapering tang or stud, $l$, for passing into the mortise $g$ of the hub.

$m$ is a strap formed with the base $k$ of the tools, which, when the tool is placed upon the handle, passes down the side of the hub $d$ upon the straps, and is secured thereto by the bolt $h$ and nut $i$. (See Figs. 1 and 2.)

By this means any one of the tools may be readily and firmly attached to the hub and handle or quickly detached therefrom and another substituted.

The manner of forming the hub $d$ to receive a hoe and give to the blade any desired inclination is illustrated by Figs. 3 and 4. Upon one side of the hub $d$, near the end thereof, there are a number of transverse grooves or notches, $n$. Four are shown. The hoe-blade $p$ has a square mortise, $t$, in its back edge to set upon the hub $d$, and the inner edge of the mortise $t$ is made as a knife-edge, $u$, which sets into one of the grooves $n$.

$q$ is a screw-bolt, having one end formed as a hook, $r$, to take into a hole in the hoe-blade, and passing through a hole in the hub $d$.

$s$ is a nut for tightening the bolt $q$ and drawing the hoe $p$ tightly to the handle to hold it at any inclination, according to which groove $n$ the knife-edge $u$ is placed in. I prefer to form a hollow in the hub $d$ where the notches $n$ are placed, (see Figs. 2 and 3,) so that the notches form offsets, which construction permits the bolt $q$ to hold the hoe more securely.

The strap $m$ of the rake (see Figs. 6 and 7) is formed at right angles to the teeth and base $b$.

I do not limit myself to the exact construction of the parts shown, as it may be varied without departing from my invention; neither do I confine my improvement to the special tools or implements described.

Having thus described my invention, I claim as new and desire to secure by Letters Patent—

The hub $d$, having apertured socket-straps $e$ and an end mortise, $g$, in combination with a base, $k$, having stud $l$ and strap $m$, all constructed and arranged as shown and described, for the purpose specified.

ARCHIBALD THOMAS CLARK.

Witnesses:
 JOHN F. CLARK,
 NEILL CLARK.